(12) United States Patent
Numa et al.

(10) Patent No.: US 11,479,949 B2
(45) Date of Patent: Oct. 25, 2022

(54) WORK VEHICLE

(71) Applicant: KOMATSU LTD., Tokyo (JP)

(72) Inventors: Yasutaka Numa, Tokyo (JP); Ikki Hirose, Tokyo (JP)

(73) Assignee: KOMATSU LTD., Tokyo (JP)

( * ) Notice: Subject to any disclaimer, the term of this patent is extended or adjusted under 35 U.S.C. 154(b) by 52 days.

(21) Appl. No.: 16/981,493

(22) PCT Filed: Mar. 26, 2019

(86) PCT No.: PCT/JP2019/013030
§ 371 (c)(1),
(2) Date: Sep. 16, 2020

(87) PCT Pub. No.: WO2020/017102
PCT Pub. Date: Jan. 23, 2020

(65) Prior Publication Data
US 2021/0031833 A1 Feb. 4, 2021

(30) Foreign Application Priority Data

Jul. 19, 2018 (JP) .............................. JP2018-135634

(51) Int. Cl.
*E02F 9/22* (2006.01)
*B60B 35/00* (2006.01)
*B60B 35/06* (2006.01)
*B62D 5/12* (2006.01)
*E02F 3/76* (2006.01)

(52) U.S. Cl.
CPC ............ *E02F 9/225* (2013.01); *B60B 35/009* (2013.01); *B60B 35/06* (2013.01); *B62D 5/12* (2013.01); *E02F 3/7636* (2013.01); *E02F 9/2275* (2013.01)

(58) Field of Classification Search
CPC ..... B60G 9/02; B60B 35/1054; B60B 35/163; B60B 35/166
USPC ............ 180/433, 435; 280/124.112; 172/813
See application file for complete search history.

(56) References Cited

U.S. PATENT DOCUMENTS 2,152,021 A * 3/1939 Baumer ................. B62D 5/093
180/436
3,480,100 A * 11/1969 Gaulke .................... B62D 5/10
180/435

(Continued)

FOREIGN PATENT DOCUMENTS

CN 106013295 A 10/2016
CN 107539363 A 1/2018

(Continued)

OTHER PUBLICATIONS

The Office Action for the corresponding Chinese application No. 201980019920.9, dated Oct. 8, 2021.

(Continued)

*Primary Examiner* — Dustin T Nguyen
*Assistant Examiner* — Michael Quandt
(74) *Attorney, Agent, or Firm* — Global IP Counselors, LLP (57) ABSTRACT

A work vehicle includes an axle frame extending in a left-right direction, a cylinder coupled to the axle frame, and a first supply conduit connected to the cylinder and configured to supply hydraulic fluid to the cylinder. The first supply conduit is fixed to the axle frame.

7 Claims, 7 Drawing Sheets (56) References Cited

U.S. PATENT DOCUMENTS

| | | | | |
|---|---|---|---|---|
| 3,752,248 | A | * 8/1973 | Stevens | B62D 5/12 |
| | | | | 180/433 |
| 3,783,966 | A | 1/1974 | Campbell et al. | |
| 4,137,990 | A | * 2/1979 | Abels | B60G 9/02 |
| | | | | 180/435 |
| 10,081,219 | B2 | * 9/2018 | Tomimatsu | B62D 49/00 |
| 10,704,226 | B2 | * 7/2020 | Yamaguchi | E02F 3/84 |
| 2017/0369097 | A1 | 12/2017 | Umemoto | |

FOREIGN PATENT DOCUMENTS

| | | | |
|---|---|---|---|
| JP | 7-117709 A | 5/1995 | |
| JP | 9-21105 A | 1/1997 | |
| JP | 2016-3740 A | 1/2016 | |
| WO | 2016/033921 A1 | 3/2016 | |

OTHER PUBLICATIONS

The International Search Report for the corresponding international application No. PCT/JP2019/013030, dated Jun. 25, 2019.

* cited by examiner

WORK VEHICLE

CROSS-REFERENCE TO RELATED APPLICATIONS

This application is a U.S. National stage application of International Application No. PCT/JP2019/013030, filed on Mar. 26, 2019. This U.S. National stage application claims priority under 35 U.S.C. § 119(a) to Japanese Patent Application No. 2018-135634, filed in Japan on Jul. 19, 2018, the entire contents of which are hereby incorporated herein by reference.

BACKGROUND

Field of the Invention

The present invention relates to a work vehicle.

Background Information

The work vehicle described in U.S. Pat. No. 3,783,966 is provided with an axle frame, a pair of brackets respectively attached to the left and right ends of the axle frame, a tie rod that couples the pair of brackets, and a steering cylinder that is coupled to the pair of brackets and to the axle frame, as a steering mechanism for left and right wheels. The left and right wheels turn to the left and right in response to the extension and contraction of the steering cylinder.

The work vehicle described in U.S. Pat. No. 3,783,966 is provided with a leaning rod that couples the pair of brackets and a leaning cylinder that is coupled to the pair of brackets and the axle frame, as a leaning mechanism of the left and right wheels. Left and right wheels are tilted to the left and right in response to the extension and contraction of the leaning cylinder.

SUMMARY

The steering cylinder and the leaning cylinder (referred to collectively as "cylinders" below) each need to be connected to a supply conduit for supplying hydraulic fluid fed from a hydraulic pump disposed on the vehicle body.

However, because moving members (the tie rod, the leaning rod, etc.) and non-moving members (the axle frame, etc.) are disposed in the vicinity of the cylinders, it is not easy to route the supply conduit so as to not interfere with said members.

An object of the present invention is to provide a work vehicle in which a supply conduit connected to a cylinder can be easily routed.

A work vehicle according to the present invention has an axle frame extending in a left-right direction, a cylinder coupled to the axle frame, and a first supply conduit connected to the cylinder and configured to supply hydraulic fluid to the cylinder. The first conduit is fixed to the axle frame.

According to the present invention, there can be provided a work vehicle in which a hydraulic fluid supply conduit connected to the steering cylinder can be routed easily.

DETAILED DESCRIPTION OF EMBODIMENT(S)

(Overall Configuration of Motor Grader 1)

Figure 1:
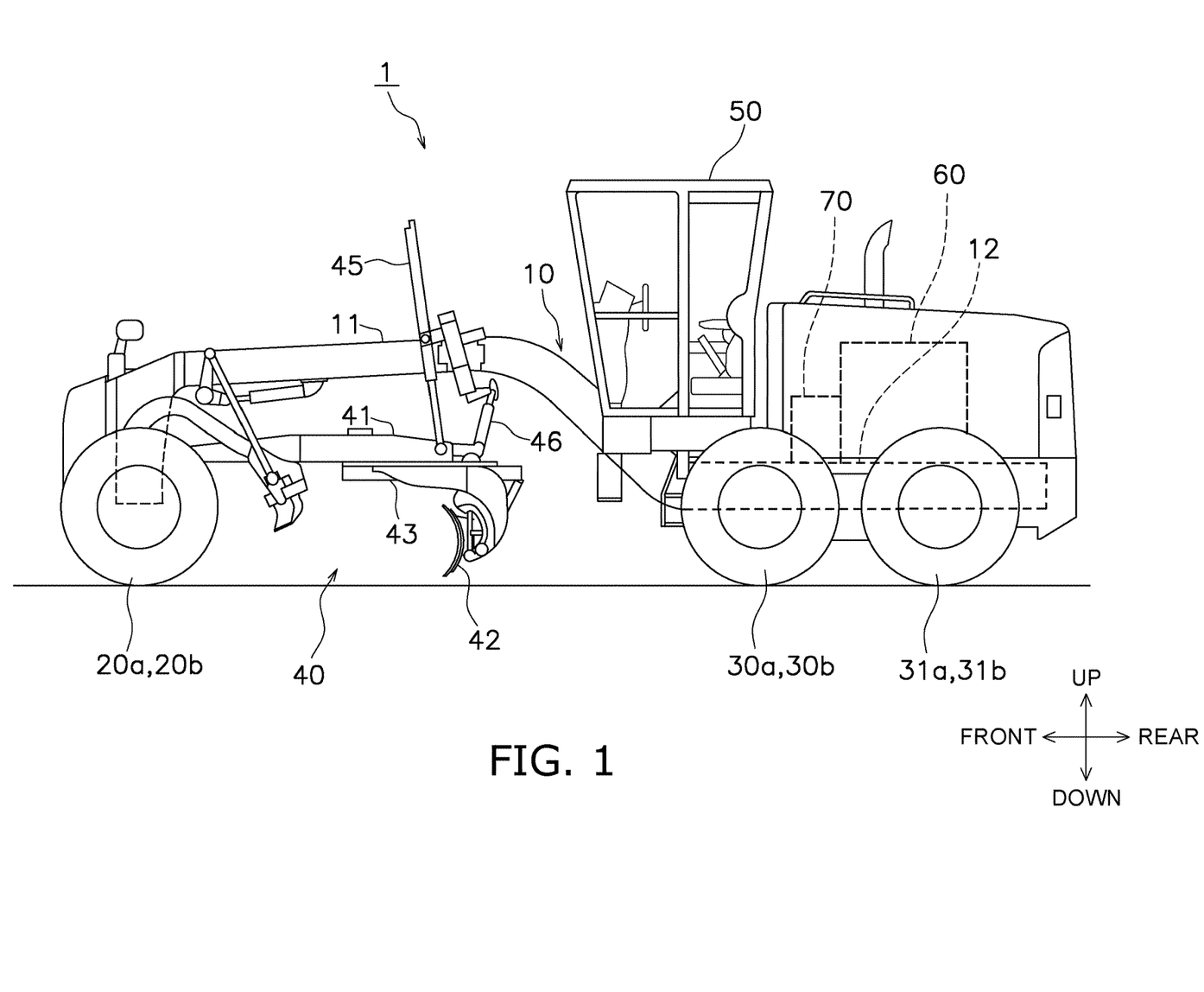
FIG. 1 is a side view of a motor grader.

FIG. 1 is a side view of a motor grader 1. In the following discussion, "up," "down," "left," and "right" are terms based on the perspective of an operator seated in the operator's seat.

The motor grader 1 is a work vehicle for performing work such as grading, snow removal, light cutting, and material mixing. The motor grader 1 is provided with a frame 10, a left and right pair of front wheels 20a, 20b, and left and right pair of first rear wheels 30a, 30b, a left and right pair of second rear wheels 31a, 31b, a work implement 40, a cab 50, an engine 60, and a hydraulic pump 70.

The frame 10 is configured by a front frame 11 and a rear frame 12. The front frame 11 extends in the front-back direction. A front end part of the front frame 11 is supported by the front wheels 20a, 20b. A rear end part of the front frame 11 is coupled to the front end part of the rear frame 12. The front frame 11 is able to turn to the left and right with respect to the rear frame 12. The front frame 11 supports the work implement 40. The rear frame 12 is supported by the first rear wheel 30a, 30b and the second rear wheels 31a, 31b. The rear frame 12 supports the cab 50, the engine 60, and the hydraulic pump 70.

The work implement 40 is attached to the front frame 11. The work implement 40 is arranged below the front frame 11. The work implement 40 is provided with a drawbar 41, a blade 42, a blade turning device 43, a lift cylinder 45, and a shift cylinder 46. The drawbar 41 is coupled at the front end part of the front frame 11. The drawbar 41 is able to swing up and down and to the right and left. The blade 42 is supported by the blade turning device 43. The blade turning device 43 rotates the blade 42 around an axis in the vertical direction. The lift cylinder 45 is coupled to the drawbar 41 and the front frame 11. The lift cylinder 45 causes the drawbar 41 to swing up and down. The shift cylinder 46 is coupled to the drawbar 41 and the front frame 11. The shift cylinder 46 causes the drawbar 41 to swing to the left and right.

The cab 50 is mounted on the frame 10. An operator's seat and operating devices and the like are arranged in the cab 50. The engine 60 is mounted on the rear frame 12. The engine 60 drives the first rear wheels 30a, 30b, and the second rear wheels 31a, 31b via a rear wheel drive device that is not illustrated. The hydraulic pump 70 is driven by the engine 60. For example, a skew plate type or an inclined shaft type of hydraulic pump may be used as the hydraulic pump 70. The hydraulic pump 70 feeds hydraulic fluid to a below-mentioned leaning cylinder 88 and a pair of left and right steering cylinders 89a, 89b, as well as to the lift cylinder 45 and the shift cylinder 46.

(Axle Assembly 80 of Front Wheels 20a, 20b)

Figure 2:
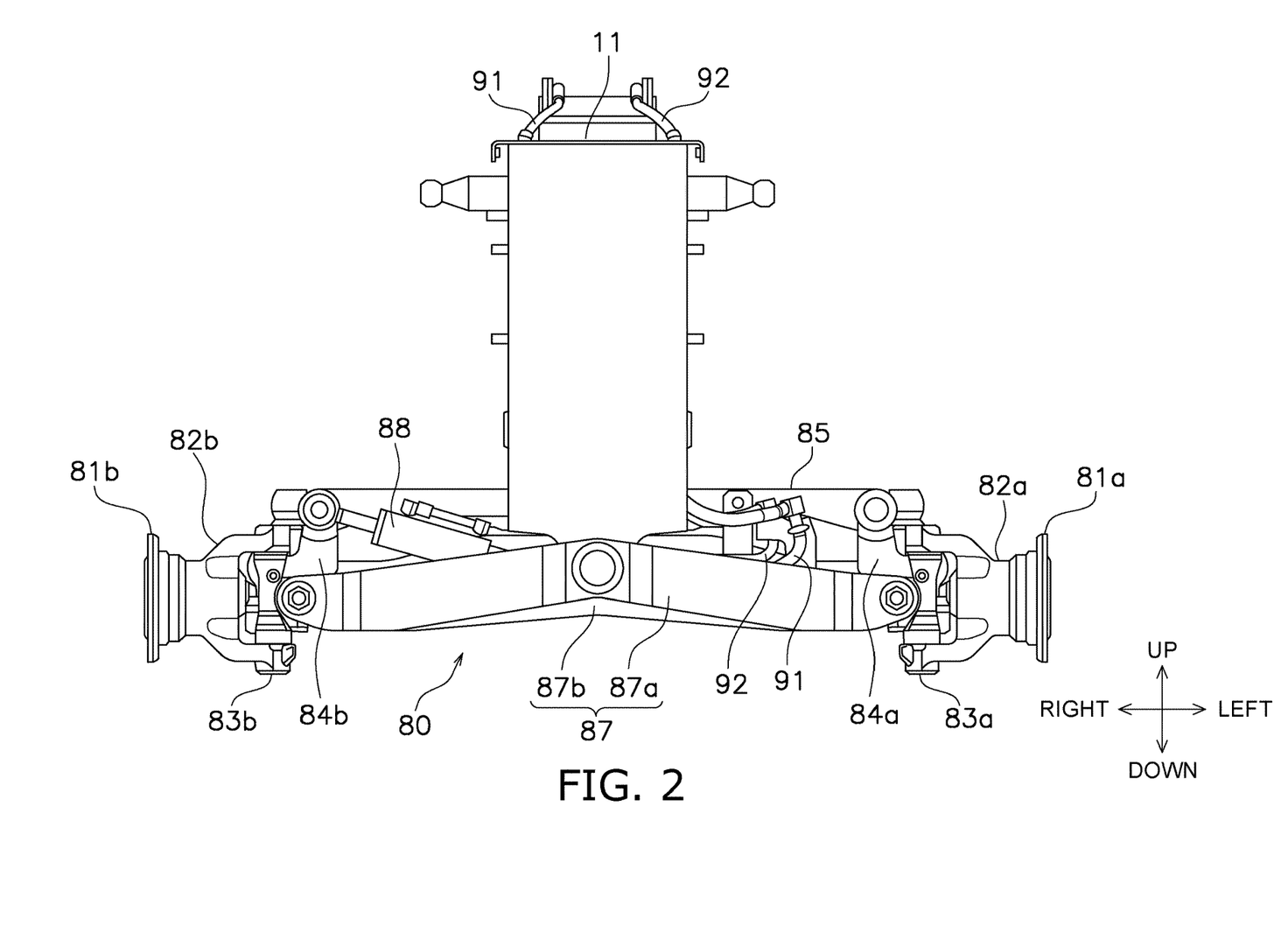
FIG. 2 is a front view of an axle assembly.
Figure 3:
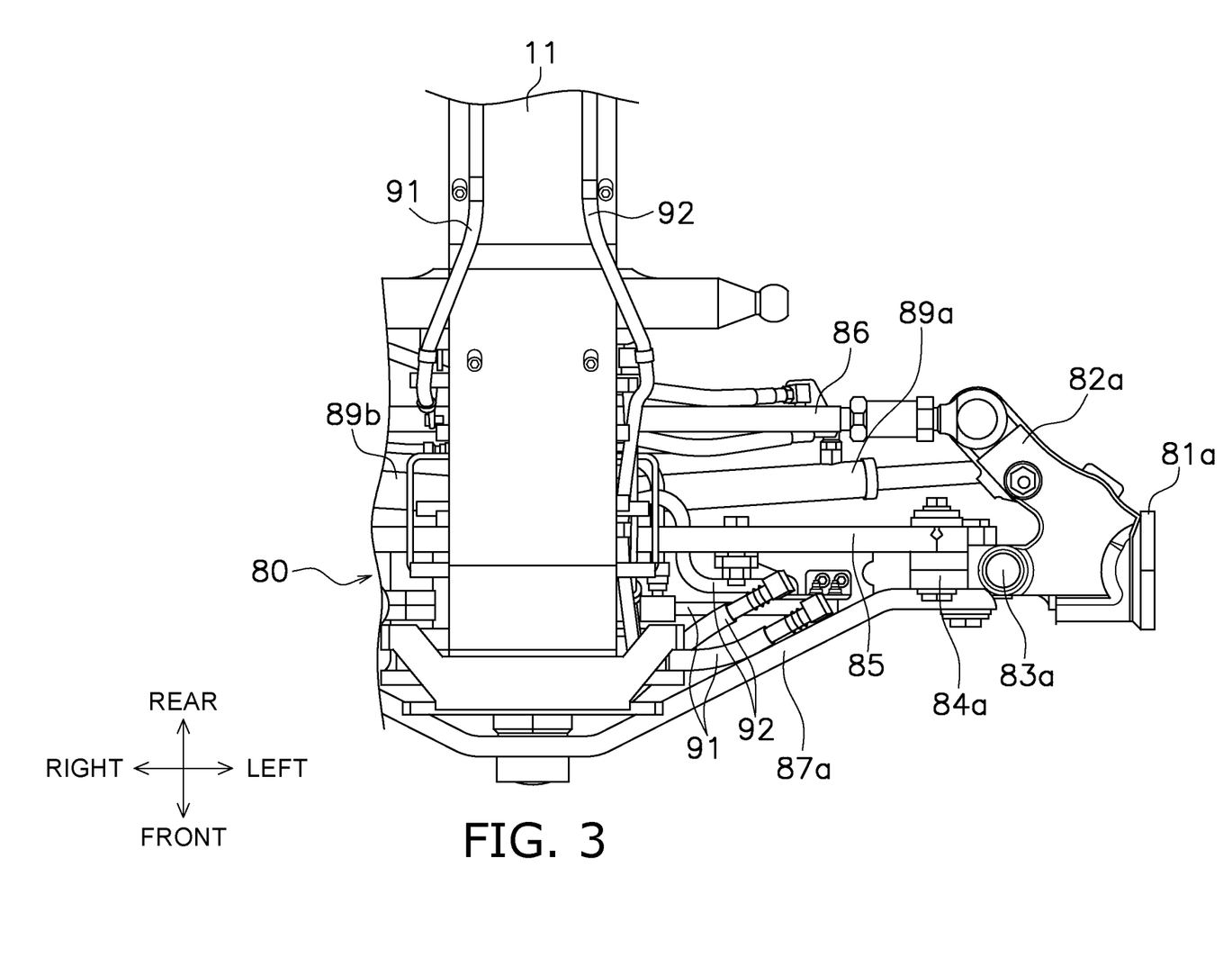
FIG. 3 is a top view of the axle assembly.

FIG. 2 is a front view of the axle assembly 80 of the front wheels 20a, 20b. FIG. 3 is a top view of the axle assembly 80 of the front wheels 20a, 20b.

The axle assembly 80 is attached to the front end part of the front frame 11. The axle assembly 80 carries the steering mechanism and the leaning mechanism of the front wheels 20a, 20b.

The axle assembly 80 is provided with a pair of left and right hubs 81a, 81b, a pair of left and right knuckle brackets 82a, 82b, a pair of left and right king pins 83a, 83b, a pair of left and right king pin brackets 84a, 84b, a leaning rod 85, a tie rod 86, a front axle frame 87, a leaning cylinder 88, a pair of left and right steering cylinders 89a, 89b, a supply conduit (not illustrated) for leaning, and first and second supply conduits 91, 92 for steering.

The leaning rod 85 and the tie rod 86 are moving members that move in response to the leaning or steering of the front wheels 20a, 20b. The front axle frame 87 is a non-moving member that does not move in response to the leaning or the steering of the front wheels 20a, 20b. The supply conduit (not illustrated) for leaning and the first and second supply conduits 91, 92 for steering are routed so as to avoid the range of movement of the moving members and not to interfere with the moving members.

The front wheels 20a, 20b are respectively attached to the hubs 81a, 81b. The knuckle brackets 82a, 82b are respectively coupled to the hubs 81a, 81b. The knuckle brackets 82a, 82b are respectively coupled to the king pin brackets 84a, 84b via the king pins 83a, 83b. The king pins 83a, 83b are respectively disposed in approximately the vertical direction. The knuckle brackets 82a, 82b respectively swing around the king pins 83a, 83b. The knuckle bracket 82a is able to swing up and down and forward and rearward with respect to both end parts of the front axle frame 87.

The leaning rod 85 is coupled to the king pin brackets 84a, 84b. The tie rod 86 is coupled to the knuckle brackets 82a, 82b. The front axle frame 87 extends in the left-right direction. The front axle frame 87 is coupled to the king pin brackets 84a, 84b. The front axle frame 87 has a front beam 87a and a rear beam 87b. The leaning cylinder 88 is disposed between the front beam 87a and the rear beam 87b. The rear beam 87b is disposed in front of the steering cylinders 89a, 89b. A configuration of the front axle frame 87 is explained below.

The leaning cylinder 88 is coupled to the king pin bracket 84b and the front axle frame 87. Hydraulic fluid fed from the hydraulic pump 70 (see FIG. 1) is supplied to the leaning cylinder 88 via the supply conduit (not illustrated) for leaning.

The steering cylinder 89a is coupled to the knuckle bracket 82a and the front axle frame 87. The steering cylinder 89b is coupled to the knuckle bracket 82b and the front axle frame 87.

The first and second supply conduits 91, 92 supply hydraulic fluid fed from the hydraulic pump 70 to the steering cylinders 89a, 89b. As illustrated in FIG. 2, the first and second supply conduits 91, 92 are positioned above a lower end part of the front beam 87a within the front axle frame 87. The first and second supply conduits 91, 92 do not protrude below the front beam 87a. As illustrated in FIG. 3, the first and second supply conduits 91, 92 are positioned behind the front beam 87a within the front axle frame 87. The first and second supply conduits 91, 92 do not protrude in front of the front beam 87a. Each of the first and second supply conduits 91, 92 are fixed to the front axle frame 87. The configurations of the first and second supply conduits 91, 92 are explained below.

The knuckle brackets 82a, 82b, the king pins 83a, 83b, tie rod 86 and the steering cylinders 89a, 89b configure the steering mechanism of the front wheels 20a, 20b. The steering cylinders 89a, 89b extend and contract in response to a steering operation by an operator. When turning to the right, the steering cylinder 89a extends and the steering cylinder 89b contracts due to the hydraulic fluid being supplied from the first supply conduit 91 to the cap side of the steering cylinder 89a and to the rod side of the steering cylinder 89b. When turning to the left, the steering cylinder 89a contracts and the steering cylinder 89b extends due to hydraulic fluid from the second supply conduit 92 being supplied to the rod side of the steering cylinder 89a and to the cap side of the steering cylinder 89b. The front wheels 20a, 20b turn to the right and left due to the knuckle brackets 82a, 82b coupled to the tie rod 85 respectively interlinking and turning around the king pins 83a, 83b in response to the extension and contraction of the steering cylinders 89a, 89b. While the front wheels 20a, 20b can be turned to the right and left with only one of the steering cylinders 89a, 89b, the tie rod 85 can be moved more smoothly by using the left and right pair of steering cylinders 89a, 89b as in the present embodiment.

The king pin brackets 84a, 84b, the leaning rod 85, and the leaning cylinder 88 configure the leaning mechanism of the front wheels 20a, 20b. The leaning cylinder 88 extends and contracts in response to a leaning operation performed by the operator. When tilting the front wheels 20a, 20b to the right from the upright position, the leaning cylinder 88 is extended by supplying hydraulic fluid to the cap side of the leaning cylinder 88 from the supply conduit for leaning. When tilting the front wheels 20a, 20b to the left from the upright position, the leaning cylinder 88 is contracted by supplying hydraulic fluid to the rod side of the leaning cylinder 88 from the supply conduit for leaning. The front wheels 20a, 20b are made to lean to the right and left by tilting, with respect to the front axle frame 87, the king pin brackets 84a, 84b coupled to the leaning rod 85 in response to the extension and contraction of the leaning cylinder 88 coupled to the king pin bracket 84b. Leaning is beneficial for improving the ability to perform small turns by the motor grader 1 or for maintaining the straightness of cutting work.

(Front Axle Frame 87)

Figure 4:
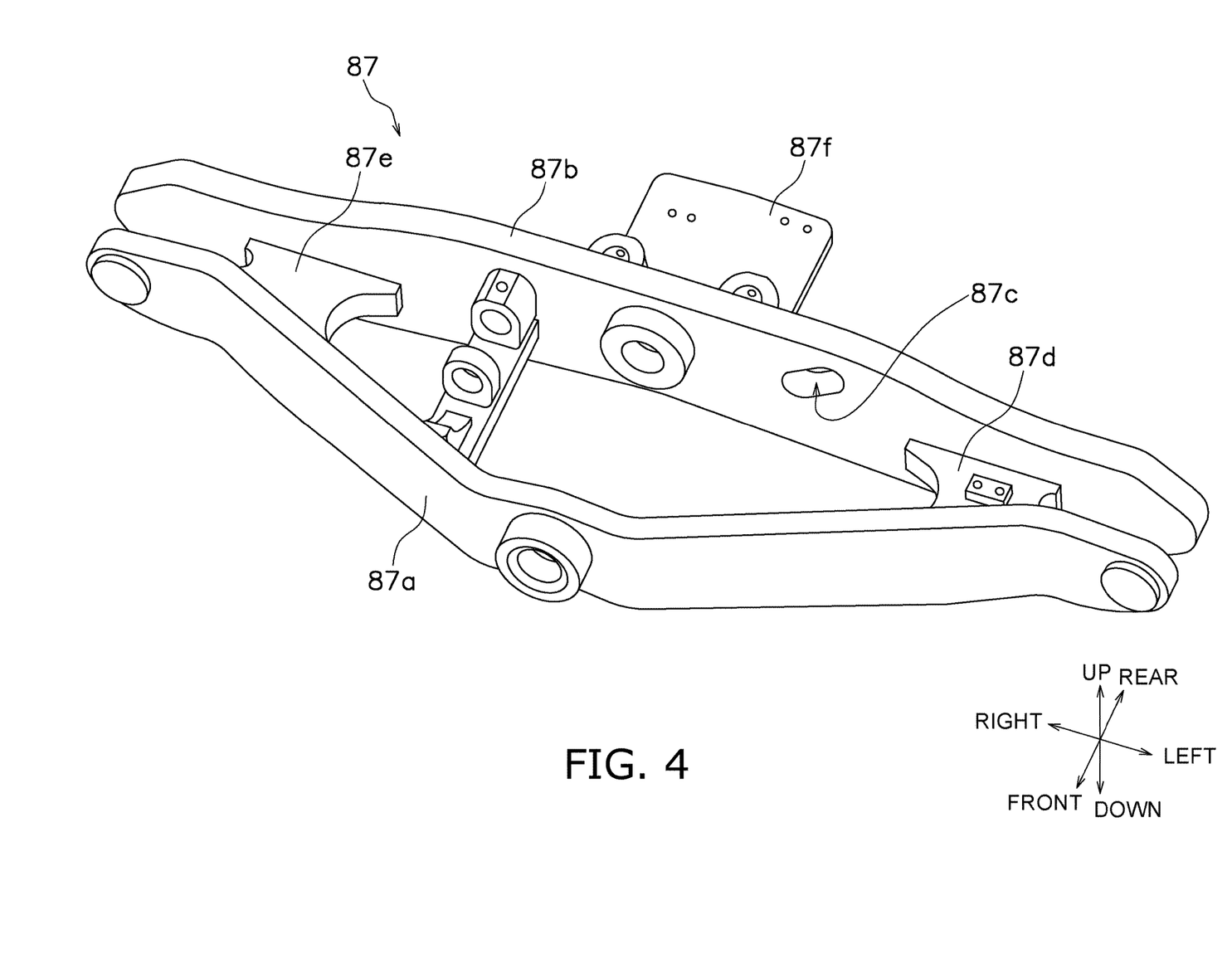
FIG. 4 is a perspective view of a front axle frame.
Figure 5:
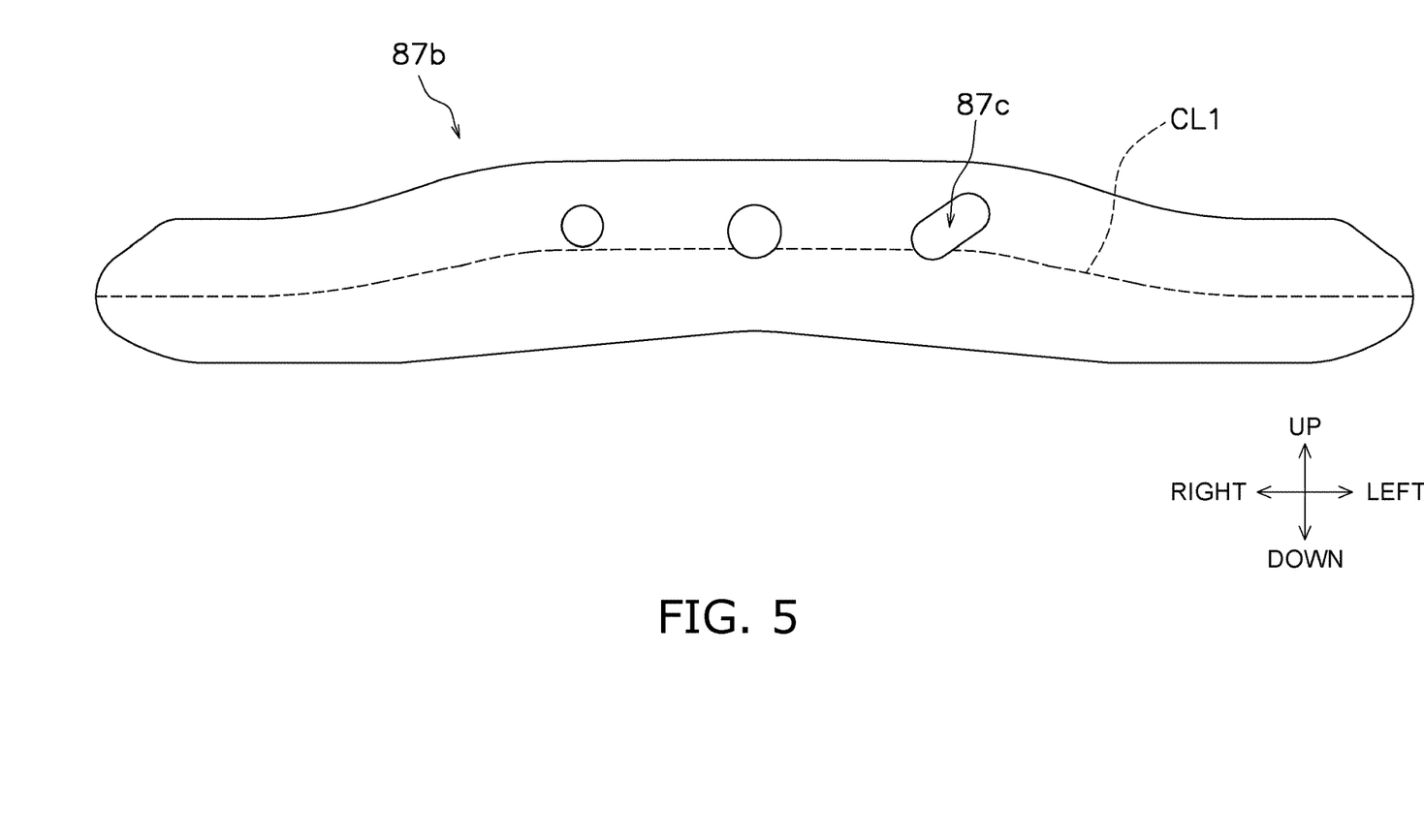
FIG. 5 is a front view of a rear beam.

A configuration of the front axle frame 87 will be explained next with reference to the drawings. FIG. 4 is a perspective view of the front axle frame 87 seen obliquely from the left and from above and from in front. FIG. 5 is a front view of the rear beam 87b.

As illustrated in FIG. 4, the front axle frame 87 has the front beam 87a, the rear beam 87b, an insertion hole 87c, a first reinforcing part 87d, a second reinforcing part 87e, and a branch support part 87f.

The front beam 87a extends in the left-right direction. The front beam 87a is disposed in front of the rear beam 87b. While the front beam 87a has a plate shape in the present embodiment, the shape of the front beam 87a is not limited in particular.

The rear beam 87ba extends in the left-right direction. The rear beam 87b is disposed behind the front beam 87a. While the rear beam 87b has a plate shape in the present embodiment, the shape of the rear beam 87b is not limited in particular.

The insertion hole 87c is formed in the rear beam 87b. The insertion hole 87c penetrates the rear beam 87b in the front-back direction. The insertion hole 87c is used as a passageway for the first and second supply conduits 91, 92. The first and second supply conduits 91, 92 are each inserted through the insertion hole 87c. As a result, the insertion hole 87c is formed as a long hole that extends in a predetermined direction.

As illustrated in FIG. 5, the insertion hole 87c extends obliquely in the left-right direction in a front view of the rear beam 87b. As a result, the first and second supply conduits 91, 92 can each be easily pulled out without interfering with the other thereof.

As illustrated in FIG. 5, the insertion hole 87c also overlaps a neutral line CL1 in the front view of the rear beam 87b. As a result, a reduction in the strength of the rear beam 87b due to the provision of the insertion hole 87c can be suppressed. The neutral line CL1 is a line that connects center points in the up-down direction of the rear beam 87b in a front view of the rear beam 87b.

The first reinforcing part 87d is disposed between the front beam 87a and the rear beam 87b. The first reinforcing part 87d is connected to left end parts of the front beam 87a and the rear beam 87b. While the first reinforcing part 87d is formed in a plate shape in the present embodiment, the shape of the first reinforcing part 87d is not limited in particular.

The second reinforcing part 87e is disposed between the front beam 87a and the rear beam 87b. The second reinforcing part 87e is connected to right end parts of the front beam 87a and the rear beam 87b. While the second reinforcing part 87e is formed in a plate shape in the present embodiment, the shape of the second reinforcing part 87e is not limited in particular.

The branch support part 87f is connected to the rear beam 87b. The branch support part 87f is disposed behind the rear beam 87b. The branch support part 87f supports below-mentioned branch parts of each of the first and second supply conduits 91, 92.

(First and Second Supply Conduits 91, 92)

Figure 6:
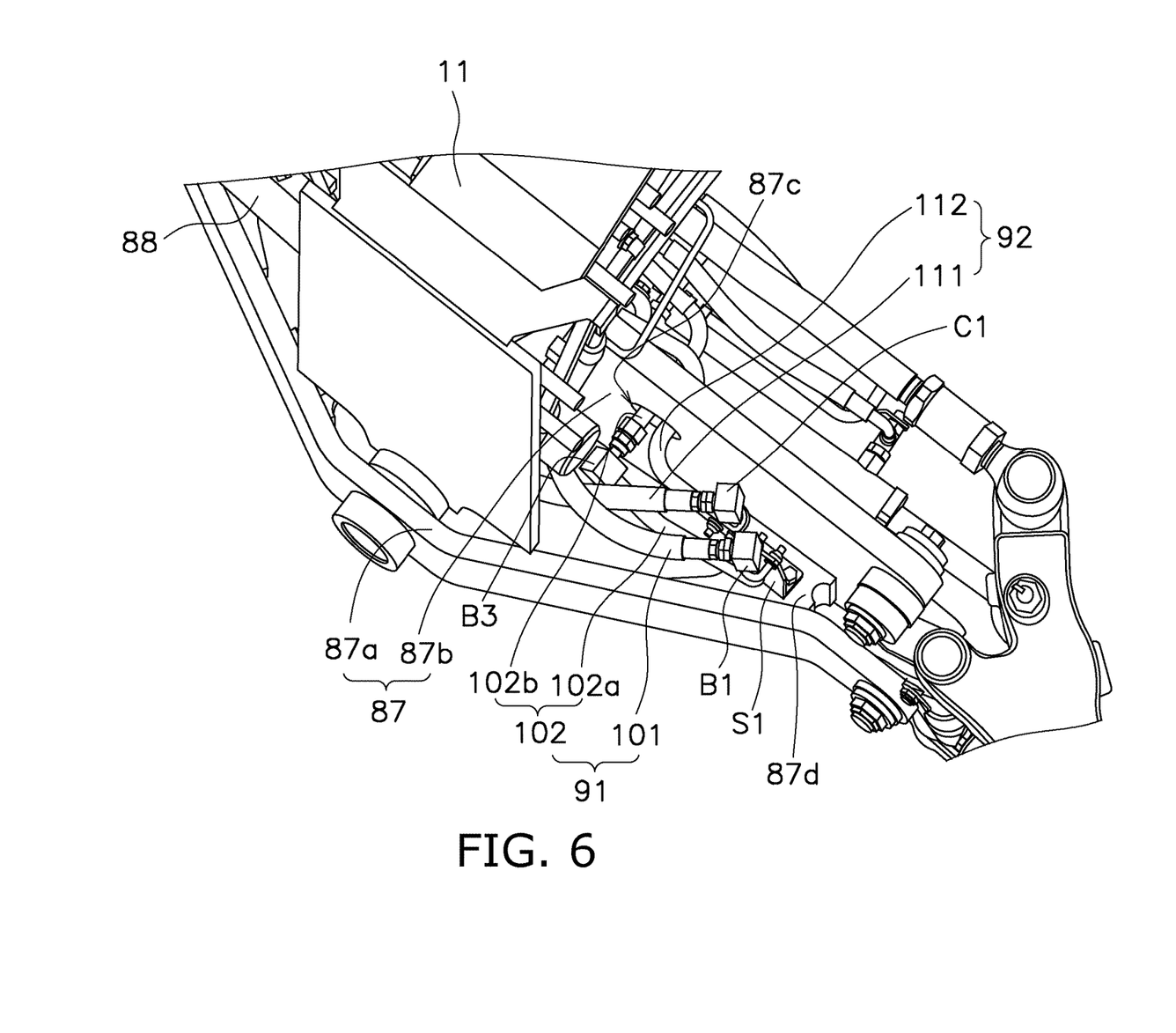
FIG. 6 is a perspective view of the axle assembly.
Figure 7:
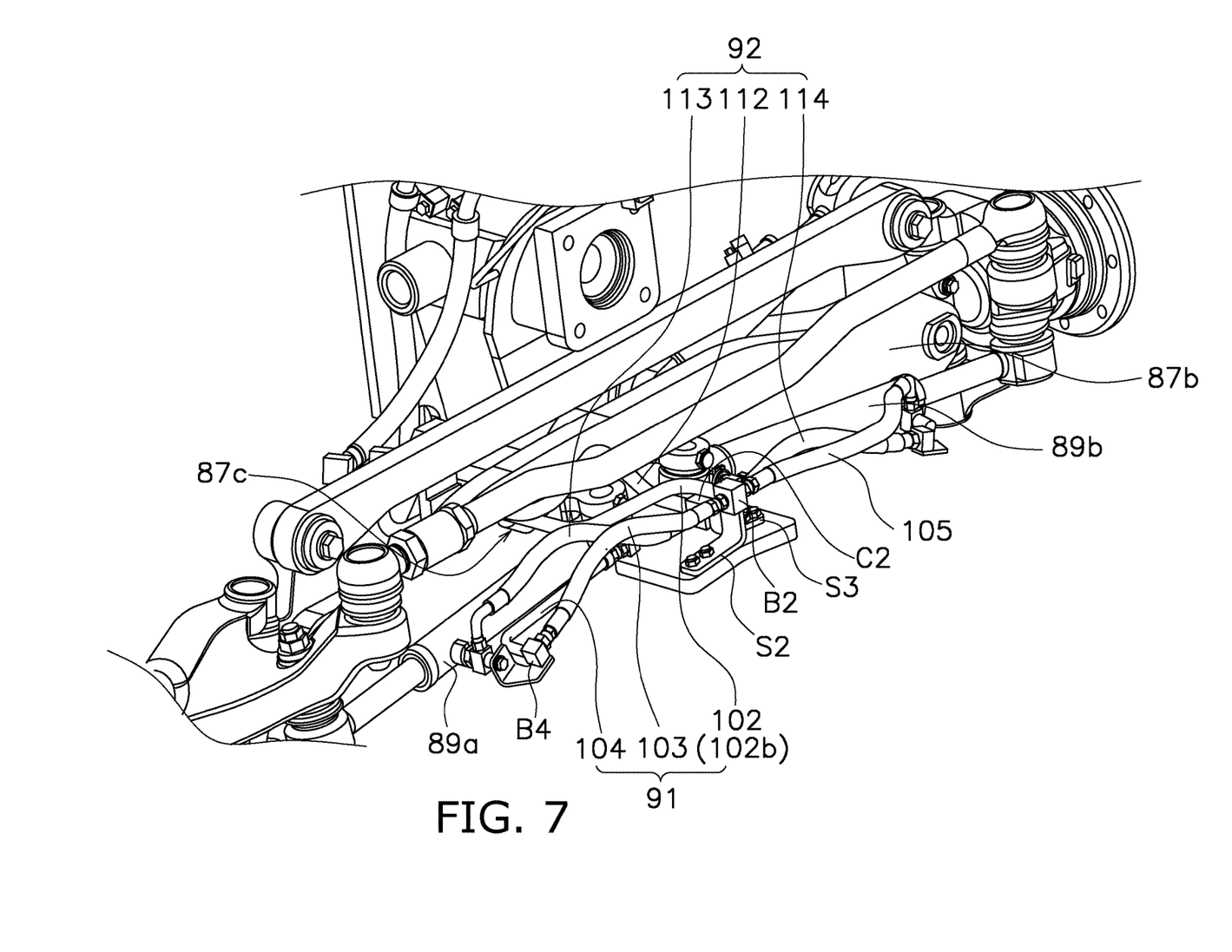
FIG. 7 is a perspective view of the axle assembly.

Configurations of the first and second supply conduits 91, 92 for steering will be explained next with reference to the drawings. FIG. 6 is a perspective view of the axle assembly 80 of the front wheels 20a, 20b seen obliquely from the left and from the front and above. FIG. 7 is a perspective view of the axle assembly 80 of the front wheels 20a, 20b seen obliquely from the left and from behind and above.

The first supply conduit 91 for steering is an example of a "first supply conduit" according to the present invention, and the second supply conduit 92 is an example of a "second supply conduit" according to the present invention.

The first and second supply conduits 91, 92 supply hydraulic fluid fed from the hydraulic pump 70 (see FIG. 1) to the steering cylinders 89a, 89b. The first supply conduit 91 is connected to the rod side of the steering cylinder 89a and to the cap side of the steering cylinder 89b. The second supply conduit 92 is connected to the cap side of the steering cylinder 89a and to the rod side of the steering cylinder 89b.

(First Supply Conduit 91)

The first supply conduit 91 has a first pipe part 101, a second pipe part 102, a third pipe part 103, a fourth pipe part 104, and a fifth pipe part 105. A flexible hose may be desirably used in the first pipe part 101. Steel pipes that can be set to a desired bend radius may be desirably used as the second to fifth pipe parts 102 to 105.

The first pipe part 101 extends from the front frame 11 toward the front axle frame 87. The first pipe part 101 is connected to the second pipe part 102 via a coupling block B1 between the front beam 87a and the rear beam 87b. The first pipe part 101 guides hydraulic fluid fed from the hydraulic pump 70 to the second pipe part 102.

The second pipe part 102 is inserted through the insertion hole 87c of the rear beam 87b. The second pipe part 102 is connected to the first pipe part 101 via the coupling block B1 between the front beam 87a and the rear beam 87b. The second pipe part 102 is connected to the third pipe part 103 and the fifth pipe part 105 via a coupling block B2 behind the rear beam 87b. The second pipe part 102 branches to the third pipe part 103 and the fifth pipe part 105.

The second pipe part 102 has a first portion 102a and a second portion 102b as illustrated in FIG. 6.

The first portion 102a is connected to the first pipe part 101 and the second portion 102b. The first portion 102a is disposed between the front beam 87a and the rear beam 87b. The first portion 102a is disposed along the rear beam 87b. The first portion 102a extends in the left-right direction. The first portion 102a is fixed to the front axle frame 87. Specifically, an end part on the first pipe part 101 side of the first portion 102a is fixed to the first reinforcing part 87d of the front axle frame 87 via a stay 51. The end part on the first pipe part 101 side of the first portion 102a is fixed to the stay 51 via a U-shaped bolt.

The second portion 102b is connected to the first portion 102a via a coupling block B3 in front of the rear beam 87b. The second portion 102b is inserted through the insertion hole 87c of the rear beam 87b. The second portion 102 extends in the front-back direction. The second portion 102b is connected to the third pipe part 103 and the fifth pipe part 105 via the coupling block B2 behind the rear beam 87b. The coupling block B2 is fixed to a stay S2 attached to the branch support part 87f of the front axle frame 87.

The third pipe part 103 is coupled to the second pipe part 102 and the fourth pipe part 104. The third pipe part 103 is connected to the second pipe part 102 via the coupling block B2. The third pipe part 103 is connected to the fourth pipe part 104 via a coupling block B4. The fourth pipe part 104 is connected to the third pipe part 103 and the cap side of the steering cylinder 89a. The fifth pipe part 105 is connected to the second pipe part 102 and the rod side of the steering cylinder 89b.

(Second Supply Conduit 92)

The second supply conduit 92 has a first pipe part 111, a second pipe part 112, a third pipe part 113, a fourth pipe part 114, and an unillustrated fifth pipe part. A flexible hose may be desirably used in the first pipe part 111. Steel pipes the bend radius of which can be set as desired, may be used in the second to fourth pipe parts 112 to 114.

The first pipe part 111 extends from the front frame 11 toward the front axle frame 87. The first pipe part 111 is connected to the second pipe part 112 via a coupling block C1 between the front beam 87a and the rear beam 87b. The first pipe part 111 guides hydraulic fluid fed from the hydraulic pump 70 to the second pipe part 112.

The second pipe part 112 is connected to the first pipe part 111 via the coupling block C1 between the front beam 87a and the rear beam 87b. The second pipe part 112 is fixed to the front axle frame 87. Specifically, an end part on the first pipe part 111 side of the second pipe part 112 is fixed to the first reinforcing part 87d of the front axle frame 87 via the stay S1. The end part on the first pipe part 111 side of the second pipe part 112 is fixed to the stay S1 with a U-shaped bolt.

The second pipe part 112 is inserted through the insertion hole 87c of the rear beam 87b. The second pipe part 112 is connected to the third pipe part 113 and the fourth pipe part 114 via a coupling block C2 behind the rear beam 87b. The second pipe part 112 branches off to the third pipe part 113 and the fourth pipe part 114. The coupling block C2 is fixed to a stay S3 attached to the branch support part 87f of the front axle frame 87.

The third pipe part 113 is connected to the second pipe part 112 and the rod side of the steering cylinder 89a. The fourth pipe part 114 is connected to the second pipe part 112 and the cap side of the steering cylinder 89b.

(Characteristics)

The first supply conduit 91 connected to the steering cylinder 89a (example of the "cylinder") is fixed to the front axle frame 87 (example of the "axle frame"). Therefore, the first supply conduit 91 can be routed easily without interfering with the moving members (leaning rod 85 and tie rod 86).

The rear beam 87b of the front axle frame 87 has the insertion hole 87c through which the first supply conduit 91 is inserted. Therefore, the routing of the first supply conduit 91 can be performed easily.

The second supply conduit 92 connected to the steering cylinder 89a is inserted through the insertion hole 87c of the rear beam 87b. The insertion hole 87c extends obliquely in the left-right direction in a front view of the rear beam 87b. Therefore, the first and second supply conduits 91, 92 can each be easily pulled out from the insertion hole 87c without interfering with the other thereof even when both the first and second supply conduits 91, 92 are inserted through the insertion hole 87c.

The front axle frame 87 has the first reinforcing part 87d connected to the front beam 87a and the rear beam 87b. The first supply conduit 91 is fixed to the first reinforcing part 87d. Therefore, the routing of the first supply conduit 91 can be performed more easily because the first supply conduit 91 can be fixed in a position spaced further away from the front beam 87a and the rear beam 87b in comparison to a case in which the first supply conduit 91 is fixed directly to the front beam 87a or the rear beam 87b.

The first supply conduit 91 is positioned above the lower end part of the front beam 87a within the front axle frame 87. Therefore, damage to the first supply conduit 91 caused by contact with flying stones or obstructions can be suppressed.

The first supply conduit 91 is positioned behind the front beam 87a within the front axle frame 87. Therefore, damage to the first supply conduit 91 caused by contact with flying stones or obstructions can be suppressed.

The first supply conduit 91 has the first pipe part 101 and the second pipe part 102. The first pipe part 101 is connected to the second pipe part 102 between the front beam 87a and the rear beam 87b. The second pipe part 102 is fixed to the front axle frame 87 between the front beam 87a and the rear beam 87b and is inserted through the insertion hole 87c. Therefore, the first supply conduit 91 can be assembled easily even when the first supply conduit 91 is inserted through the insertion hole 87c.

The second pipe part 102 has the first portion 102a and the second portion 102b. The first portion 102a is fixed to the front axle frame 87 between the front beam 87a and the rear beam 87b and extends along the rear beam 87b. The second portion 102b is connected to the first portion 102a and is inserted through the insertion hole 87c. Therefore, the first supply conduit 91 can be assembled easily even when the first supply conduit 91 is inserted through the insertion hole 87c along with the second supply conduit 92.

Other Embodiments

While the motor grader 1 has been explained as an example of a work vehicle to which the axle assembly according to the present invention has been applied in the above embodiment, the axle assembly according to the present invention can be widely applied to a work vehicle that can travel with a pair of left and right wheels.

While a case in which the axle assembly according to the present invention is applied to the front wheels 20a, 20b has been explained in the above embodiment, the axle assembly according to the present invention can be applied to wheels other than the front wheels.

While a case in which the first supply conduit according to the present invention has been applied to the steering cylinders 98a, 89b has been explained in the above embodiment, the first supply conduit according to the present invention may also be applied to the leaning cylinder 88.

While the motor grader 1 is provided with a pair of left and right steering cylinders 89a, 89b in the above embodiment, the motor grader 1 may only be provided with either one of the steering cylinders.

While the axle frame 87 has the front beam 87a and the rear beam 87b in the above embodiment, the configuration of the axle frame 87 is not limited in particular.

While the first supply conduit 91 is fixed to the first reinforcing part 87d within the axle frame 87 in the above embodiment, the position for fixing the first supply conduit 91 is not limited in particular.

While the first and second supply conduits 91 and 92 are both inserted through the insertion hole 87c of the rear beam 87b in the above embodiment, at least one of the first and second supply conduits 91 and 92 may not be inserted through the insertion hole 87c.

The invention claimed is:

1. A work vehicle comprising:
an axle frame;
a left-right pair of steering cylinders disposed rearward of the axle frame and coupled to the axle frame; and
a first supply conduit connected to a rod side of one cylinder of the left-right pair of steering cylinders and a cap side of another cylinder of the left-right pair of steering cylinders and configured to supply hydraulic fluid to the left-right pair of steering cylinders; and
a second supply conduit connected to a cap side of the one cylinder of the left-right steering cylinders and a rod side of the other cylinder of the left-right pair of steering cylinders and configured to supply the hydraulic fluid to the left-right pair of steering cylinders,
the axle frame including
a front beam extending in a left-right direction, and
a rear beam disposed rearward of the front beam and frontward of the left-right pair of steering cylinders, the rear beam extending in the left-right direction,
the rear beam including an insertion hole, and
the first supply conduit and the second supply conduit passing between the front beam and the rear beam, passing through the insertion hole, and connecting to the left-right pair of steering cylinders disposed rearward of the axle frame.

2. The work vehicle according to claim 1, wherein the insertion hole extends obliquely in the left-right direction as seen in a front view of the rear beam.

3. The work vehicle according to claim 2, wherein the first supply conduit has a first pipe part and a second pipe part,
the first pipe part is connected to the second pipe part between the front beam and the rear beam, and
the second pipe part is fixed to the axle frame between the front beam and the rear beam and is inserted through the insertion hole.

4. The work vehicle according to claim 3, wherein the second pipe part includes
a first portion fixed to the axle frame between the front beam and the rear beam and extending along the rear beam, and a second portion connected to the first portion and inserted through the insertion hole.

5. The work vehicle according to claim 1, wherein
the axle frame has a reinforcing part connected to the front beam and the rear beam, and
the first supply conduit is fixed to the reinforcing part.

6. The work vehicle according to claim 1, wherein
the first supply conduit is positioned above a lower end part of the front beam.

7. The work vehicle according to claim 1, wherein
the first supply conduit is positioned behind the front beam.

* * * * *